INVENTORS.
CLAUDE R. BIGBIE
ELBERT A. PENCE, JR.

BY

ATTORNEYS.

United States Patent Office 2,966,656
Patented Dec. 27, 1960

2,966,656

SPHERICAL ELECTRO-ACOUSTIC TRANSDUCER WITH INTERNAL HEATER

Claude R. Bigbie and Elbert A. Pence, Jr., Seattle, Wash., assignors, by mesne assignments, to the United States of America as represented by the Secretary of the Navy Filed Aug. 2, 1956, Ser. No. 601,846

1 Claim. (Cl. 340—10)

The present invention relates to electrical transducers and particularly to an ultrasonic electro-acoustic transducer that is temperature controlled by means of an electric heater.

Heretofore, electrical transducers have proved to be unsatisfactory in many applications due to their resonant frequency shift as a function of temprature. The device of the present invention overcomes the limitations of the prior devices by controlling the temperature of electrical transducers by means of an electrical heater.

It is an object of the invention therefore to provide a new and improved electrical transducer device which avoids the limitations of prior devices due to changes in temperature.

Another object of the present invention is to provide a new and improved electrical transducer device in which the frequency will be practically constant.

It is a further object of the present invention to provide a new and improved electrical transducer device of ferro-electric material such as barium titanate which includes a heater to provide constant temperature.

Other objects and many of the attendant advantages of this invention will be readily appreciated as the same become better understood by reference to the following detailed description when considered in connection with the accompanying drawings wherein.

Figure 1:
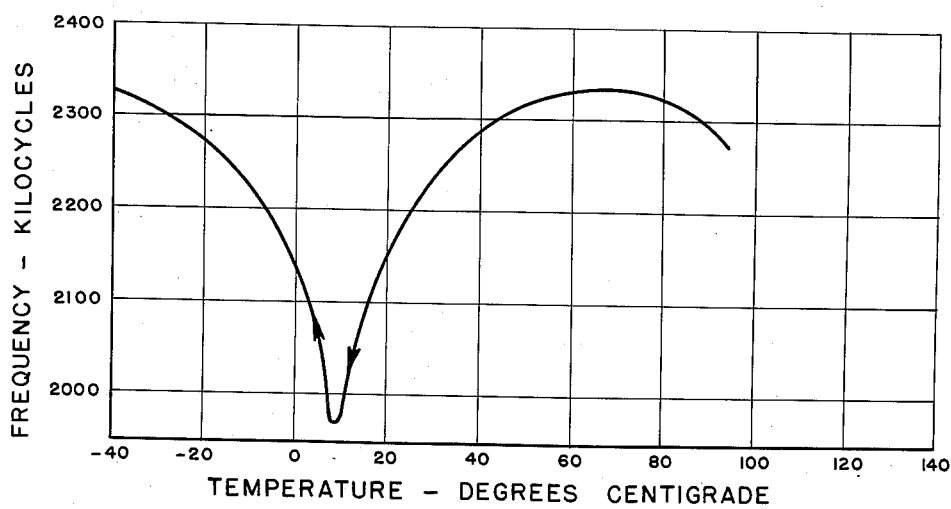
Fig. 1 is a typical frequency vs. temperature curve for barium titanate.

In many practical applications for an ultrasonic electro-acoustic transducer, such as in sonar equipment where the transducer is submerged in the ocean, water temperature variation may be large enough to cause an intolerable degree of resonant frequency variation. A typical frequency vs. temperature curve for a barium titanate transducer is shown in Fig. 1. On the curve it can be seen that if the transducer is operated in a temperature region where the curve has a steep slope a small change in temperature can give a relatively large change in frequency. However, operation on the flat portion of the curve will result in the frequency remaining practically constant. To accomplish and assure operation of the transducer of the present invention in the flat region of the curve, the transducer is formed as a hollow sphere, and an electrical heater is enclosed therein. For example, in underwater tests made on a transducer of the present invention, using a 10 watt heater inside a nominally 400 kc./s. transducer, the frequency of the transducer was constant within 2 kilocycles over a seawater temperature range from 7° C. to 22° C.

Figure 2:
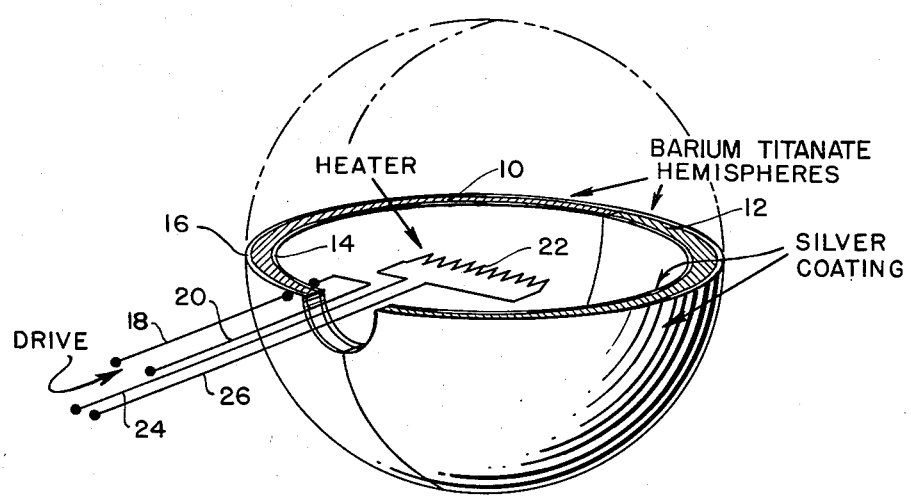
Fig. 2 is a perspective cross-sectional view of an ultrasonic electro-acoustic transducer device in accordance with the present invention.

The temperature stable electrical transducer of the present invention, in its preferred embodiment is constructed as follows: Referring to the illustration of Fig. 2, two ground hemispherical bowls 10 and 12, made from barium titanate or other materials suitable for making transducers, are each provided with an inner coating 14 and an outer coating 16 of silver, for example. The silver coating provides good electrical contact with the inside and outside surfaces of the barium titanate hemispherical bowls. The two silver coated hemispherical bowls are placed together to form a sphere. Outside silver coating 16 is provided with an electrical terminal 18, and inside silver coating 14 is provided with electrical terminal 20. These electrical terminals 18 and 20 are provided for driving the assembled transducer. An electrical heating arrangement 22 is provided within the transducer sphere to permit operation of the unit at an approximately optimum temperature thus greatly reducing undesirable frequency shift. Electrical connections 24 and 26 are provided to supply power to electrical heater 22. The spherical shape of the transducer allows substantially uniform heating throughout the transducer.

Obviously, many modifications and variations of the present invention are possible in the light of the above teachings. It is therefore to be understood that within the scope of the appended claim the invention may be practiced otherwise than as specifically described.

What is claimed is:

An ultrasonic electro-acoustic transducer device comprising, in combination, a hollow barium-titanate sphere having metallized inner and outer coatings provided with electrical terminals, said barium-titanate sphere having a resonant frequency-vis.-temperature characteristic exhibiting comparatively flat and steep operating regions, said comparatively steep region occurring at normally experienced seawater temperatures and said comparatively flat region occurring at temperatures markedly higher than is encountered in a seawater medium, and an electrical heating element contained within said hollow sphere and adapted to be electrically energized to bring the temperature of said sphere within said compartively flat region while in said seawater medium.

References Cited in the file of this patent

UNITED STATES PATENTS

| | | |
|---|---|---|
| 1,480,805 | Hadley et al. | Jan. 15, 1924 |
| 2,434,255 | Bond | Jan. 13, 1948 |
| 2,556,865 | Baldwin | June 12, 1951 |
| 2,565,158 | Williams | Aug. 21, 1951 |
| 2,565,159 | Williams | Aug. 21, 1951 |
| 2,640,165 | Howatt | May 26, 1953 |
| 2,732,536 | Miller | Jan. 24, 1956 |

OTHER REFERENCES

"Sonics" by Hueter and Bolt, published by Wiley and Sons (New York), 1955 (pages 122 to 126 relied on).